United States Patent [19]

Ali et al.

[11] Patent Number: 5,409,674
[45] Date of Patent: Apr. 25, 1995

[54] REACTOR FOR PREPARING CHLORINE DIOXIDE BY REACTING ALKALI CHLORATE WITH ACID

[75] Inventors: Metwalli Ali, Karben; Gerhard Jedlicka, Kelkheim, both of Germany

[73] Assignee: Metallgesellschaft Aktiengesellschaft, Frankfurt am Main, Germany

[21] Appl. No.: 227,214

[22] Filed: Apr. 13, 1994

[30] Foreign Application Priority Data

Apr. 14, 1993 [DE] Germany .................. 43 12 230.2

[51] Int. Cl.⁶ .............................................. B01J 16/00
[52] U.S. Cl. ............................ 422/195; 261/114.2; 422/191; 422/193; 422/198
[58] Field of Search .................... 261/114.2, 122.1; 422/188, 189, 193, 191, 195, 255, 260, 198

[56] References Cited

U.S. PATENT DOCUMENTS

| | | | |
|---|---|---|---|
| 699,572 | 5/1902 | Rocca | 261/114.2 X |
| 1,776,032 | 9/1930 | Kobernik | 261/114.2 |
| 1,858,158 | 5/1932 | Laird | 261/114.2 X |
| 2,491,209 | 12/1949 | Rapisarda et al. | 261/114.2 |
| 4,851,198 | 7/1989 | Lohrberg | 422/193 |
| 4,938,944 | 7/1990 | Dworak et al. | 423/478 |

*Primary Examiner*—Amalia L. Santiago
*Attorney, Agent, or Firm*—Sprung Horn Kramer & Woods

[57] ABSTRACT

The reactor comprises a plurality of gas-permeable plates, which define reaction stages, which are connected by overflow lines. An annular duct for effecting a gas distribution is provided on at least one plate. The outer wall and the inner wall of the annular duct comprises numerous gas outlet openings. The annular duct is provided with at least one vertical gas-conduction pipe, which extends from the plate and is open at both ends. The top end of the gas-conduction pipe is surrounded by a bell-like cap, which is connected to the annular duct, so that a space through which gases can flow is left between the gas-conducting pipe and the cap.

3 Claims, 1 Drawing Sheet

REACTOR FOR PREPARING CHLORINE DIOXIDE BY REACTING ALKALI CHLORATE WITH ACID

DESCRIPTION

This invention relates to a reactor for reacting alkali chlorate with acid, particularly hydrochlorid acid to produce a gaseous mixture consisting of chlorine dioxide and chlorine, which reactor comprises a plurality of gas-permeable plates, which define reaction stages, which are connected by overflow lines.

Such a reactor is known from U.S. Pat. No. 4,851,198 and the corresponding European Patent 0 227 181, from DE-A-3719878 and from U.S. Pat. No. 4,938,944 and the corresponding European Patent 0 345 863. It is common to said reactors that they comprise plates provided with central gas-distributing caps, by which outflowing gas is directed only in one direction outwardly and upwardly into the associated reaction stage.

It is an object of the invention considerably to improve the gas distribution in order to achieve an improved stripping action and higher reaction rates. In the reactor described first heretofore that object is accomplished in accordance with the invention in that an annular duct for effecting a gas distribution is provided on at least one plate and is formed in its outer wall with gas outlet openings directed toward the outer rim of the plate and its inner wall with gas outlet openings directed toward the center of the plate and that the annular duct is provided with at least one vertical gas-conducting pipe, which extends from the plate and is open at both ends and at its top end is surrounded by a bell-like cap, which is connected to the annular duct.

$ClO_2$ is prepared in the reactor in known manner by the following reaction:

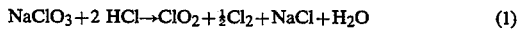

$$NaClO_3 + 2\ HCl \rightarrow ClO_2 + \tfrac{1}{2}Cl_2 + NaCl + H_2O \quad (1)$$

but the simultaneous side reaction

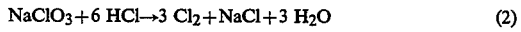

$$NaClO_3 + 6\ HCl \rightarrow 3\ Cl_2 + NaCl + 3\ H_2O \quad (2)$$

cannot entirely be suppressed. The gases which have been produced are removed from the reaction stages by rising stripping air.

The reactors which are known, e.g., from U.S. Pat. No. 4,851,198 have the disadvantages that the stripping air is not uniformly distributed in the liquid on the plates, that strong local turbulences occur and result in a disturbing formation of foam, that salt deposits are formed at the gas outlet openings of the gas-distributing caps and that the side reaction (2), in which no $ClO_2$ is formed, cannot adequately be suppressed. In the reactor in accordance with the invention said disadvantage are eliminated or at least considerably decreased and the improved gas distribution permits the construction reactors for higher outputs.

The annular duct of the reactor in accordance with the invention is preferably provided with at least 2 gas-conducting pipes provided with respective caps. The number of gas-conducting pipes in an annular channel is usually not in excess of 6 and in most cases not in excess of 4.

To ensure that the gas will be distributed as uniformly as possible in each reaction stage it is recommendable that the diameter of the inner wall of the annular duct is from 0.1 to 0.7 times the diameter of the outer rim of the plate. That diameter of the inner wall lies preferably in the range from 0.2 to 0.6 times the diameter of the outer rim of the plate.

BRIEF DESCRIPTION OF THE DRAWINGS

Details of the reactor will be explained with reference to the drawing, in which.

Figure 1:
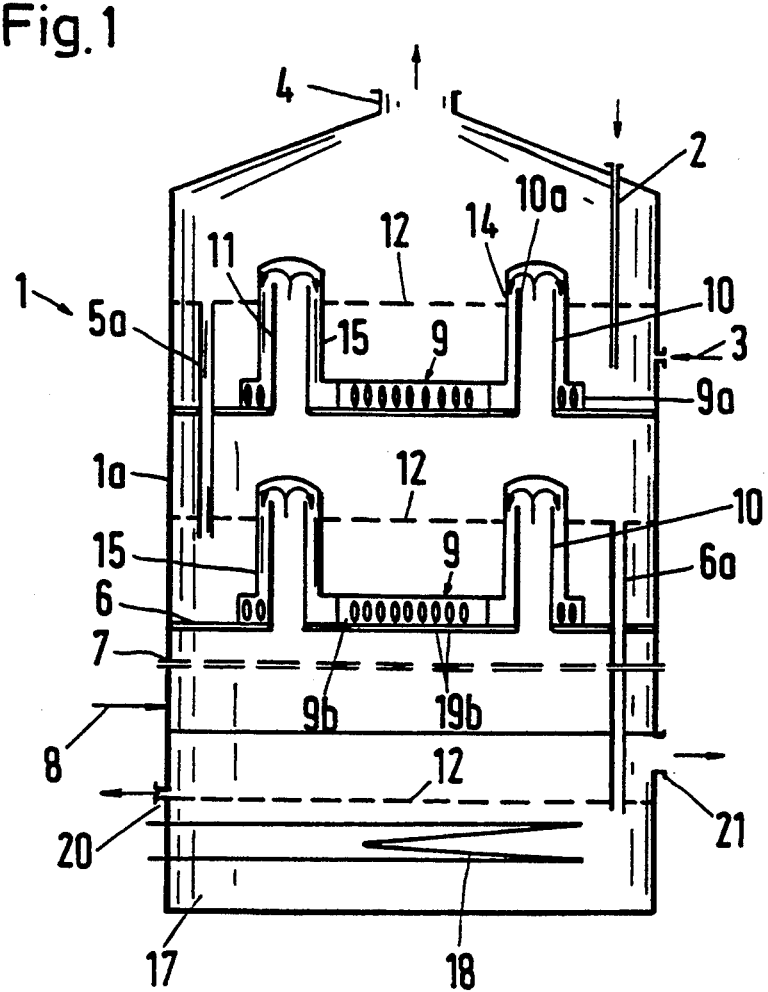
FIG. 1 is a schematic longitudinal sectional view showing the reactor and FIG. 2 is a prespective view showing a plate viewed from above.

The reactor 1 shown in FIG. 1 comprises a cylindrical shell 1a, a line 2 for supplying an aqueous solution of alkali chlorate and at least one line 3 for supplying acid. The reactor is provided at its top end with an outlet 4 for gaseous product. The reactor comprises a plurality of plates 5 and 6, each of which constitutes the bottom of a reaction stage. The height of the liquid on each plate is determined by an overflow line 5a or 6a, through which the liquid is drained downwardly.

Figure 2:
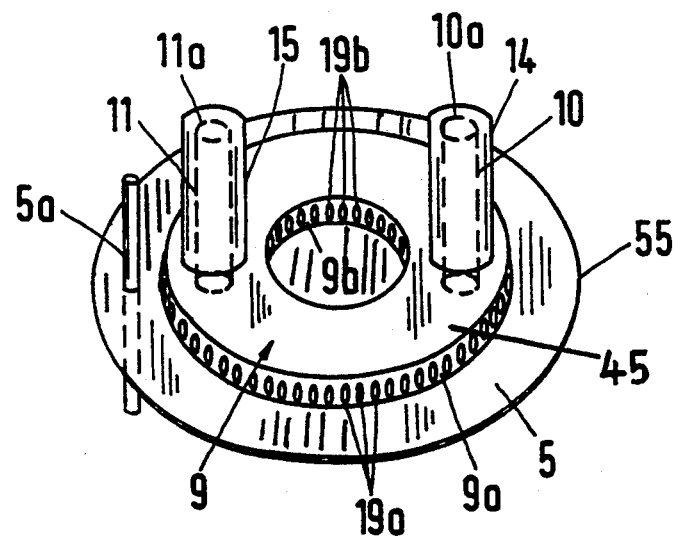

The reactor 1 usually comprises 3 to 8 reaction stages, only two of which are shown on the drawing. The dashed double line 7 indicates a portion of the reactor 1 which is not shown. Below the lowermost reaction stage, stripping air is supplied through a line 8. The stripping air rises through the reaction stages and entrains the gaseous products, particularly $ClO_2$ and $Cl_2$, to the outlet 4. To effect a distribution of the gas mixture which contains stripping air, each of the plates 5 and 6 is provided with gas-distributing means, which comprises an annular duct 9, see also FIG. 2.

The annular duct comprises an outer wall 9a, a horizontal annular wall 45 and an inner wall 9b, which surrounds the center of the plate 5. The annular duct 9 shown on the drawing is also provided with two vertical gas-conducting pipes 10 and 11, which are open at both ends. The top end 10a or 11a is disposed above the liquid level 12 indicated by a dash line, see FIG. 1. Each gas-conducting pipe 10 or 11 is provided with a bell-like cap 14 or 15, which is spaced around the gas-conducting pipe and connected to the annular channel 9.

The gas mixture which contains stripping air flows to each plate from below initially rises in the gas-conducting pipes 10 and 11 and then enters the annular space between the pipe 10 or 11 and the associated cap 14 or 15, as is indicated by the curved arrows in FIG. 1. In that annular space the gas flows downwardly into the annular duct 9, in which it is distributed in the liquid disposed on the plate. The outlet openings 19a of the outer wall 9a of the annular duct 9 direct the gas mixture toward the outer rim 55 of each plate and from the gas outlet openings 19b of the inner wall 9b of the annular duct the gas mixture flows to the center of the plate and naturally rises through the liquid in that region. It is apparent that this will result in a very good distribution of gas mixture in the liquid disposed on the plate.

A chamber 17 containing heating means 18 is disposed below the line 8 for supplying stripping air and serves to boil out in known manner the solution which has completely been reacted. The solution is subsequently removed from the reactor 1 through the outlet 20. Vapors are withdrawn at 21.

We claim:

1. A reactor for reacting alkali chlorate with acid; particularly hydrochloric acid to produce a gaseous mixture consisting of chlorine dioxide and chlorine, which reactor comprises a plurality of gas-permeable plates, which define plurality of reaction stages, consecutive stages being connected by overflow lines, at least one stage having an annular duct for effecting a gas distribution defined on a respective plate and, said duct is formed by an outer vertical wall with gas outlet openings directed toward an outer ring of the respective plate by an inner vertical wall with gas outlet openings directed toward the center of the plate and by a horizontal annular wall connected to said outer vertical wall and said inner wall; the annular duct being provided with at least one vertical gas-conducting pipe, which extends from the respective plate and is open at opposite ends, and at its top end is surrounded by a bell cap which is connected to the horizontal annular wall of said annular duct.

2. A reactor according to claim 1, wherein the annular duct is provided with at least two gas-conducting pipes and associated caps.

3. A reactor according to claim 1 wherein the annular diameter of the inner wall of the annular duct is 0.1 to 0.7 times the diameter of the outer rim of the plate to said outer wall and said inner vertical wall.

* * * * *